United States Patent [19]

Kaack et al.

[11] 4,431,584
[45] Feb. 14, 1984

[54] TRIAZINYL REACTIVE DYES CONTAINING A 1-NAPHTOL-4,8-DISULFONIC ACID COMPONENT

[75] Inventors: Hermann Kaack; Hans Baumann, both of Wachenheim, Fed. Rep. of Germany

[73] Assignee: BASF Aktiengesellschaft, Ludwigshafen, Fed. Rep. of Germany

[21] Appl. No.: 84,160

[22] Filed: Oct. 12, 1979

[30] Foreign Application Priority Data

Oct. 24, 1978 [DE] Fed. Rep. of Germany ....... 2846201

[51] Int. Cl.³ .................... C09B 62/085; D06P 1/382; D06P 3/10; D06P 3/66
[52] U.S. Cl. .................................................. 260/153
[58] Field of Search ......................................... 260/153

[56] References Cited

U.S. PATENT DOCUMENTS

| | | | |
|---|---|---|---|
| 2,889,316 | 6/1959 | Heckendorn et al. | 260/153 |
| 2,945,021 | 7/1960 | Fasciati et al. | 260/153 |
| 3,170,911 | 2/1965 | Benz et al. | 260/153 |
| 3,591,577 | 7/1971 | Moiso et al. | 260/153 |
| 3,975,370 | 8/1976 | Kullman et al. | 260/153 X |
| 4,115,378 | 9/1978 | Bien et al. | 260/146 T |
| 4,191,687 | 3/1980 | Austin | 260/153 |

FOREIGN PATENT DOCUMENTS 1093354 11/1967 United Kingdom ................ 260/153

*Primary Examiner*—Floyd D. Higel
*Attorney, Agent, or Firm*—Oblon, Fisher, Spivak, McClelland & Maier

[57] ABSTRACT

Reactive dyes which in the form of the free acids correspond to the general formula

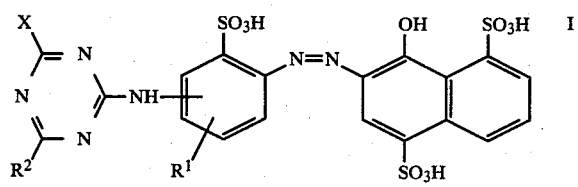

where $R^1$ is hydrogen, chlorine, bromine, methyl or hydroxysulfonyl, $R^2$ is chlorine, bromine or phenyl, or is $C_1-C_4$-alkoxy which is unsubstituted or substituted by hydroxyl, $C_1-C_4$-alkoxy or phenoxy, or is phenoxy or naphthoxy which are unsubstituted or substituted by $C_1-C_{10}$-alkyl and X is fluorine, chlorine or bromine, are exceptionally suitable for dyeing hydroxyl-containing material, e.g. cellulose or leather.

1 Claim, No Drawings

TRIAZINYL REACTIVE DYES CONTAINING A 1-NAPHTOL-4,8-DISULFONIC ACID COMPONENT

BACKGROUND OF THE INVENTION

SUMMARY OF THE INVENTION

The present invention provides dyes which in the form of the free acids correspond to the general formula I

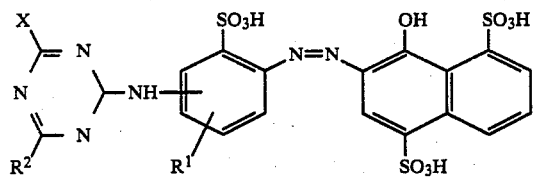

where $R^1$ is hydrogen, chlorine, bromine, methyl or hydroxysulfonyl, $R^2$ is chlorine, bromine or phenyl, or is $C_1$–$C_4$-alkoxy which is unsubstituted or substituted by hydroxyl, $C_1$–$C_4$-alkoxy or phenoxy, or is phenoxy or naphthoxy which are unsubstituted or substituted by $C_1$–$C_{10}$-alkyl and X is fluorine, chlorine or bromine.

DESCRIPTION OF THE PREFERRED EMBODIMENTS

Specific examples of radicals $R^2$, in addition to those already mentioned, are $OCH_3$, $OC_2H_5$, n- and i-$OC_3H_7$, n- and i-$OC_4H_9$ and $OC_2H_4OC_2H_5$.

A compound of the formula I may be prepared by coupling a diazonium compound of an amine of the formula II

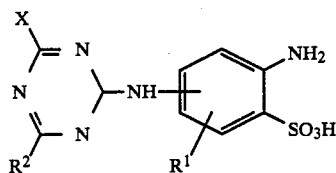

with 1-naphthol-4,8-disulfonic acid in the conventional manner.

The dyes of the formula I may be used by conventional methods for dyeing hydroxyl-containing material such as cellulose-containing textile material, eg. cotton, rayon staple, linen, natural and synthetic polyamides, eg. wool, silk or nylon, and leather.

The dyeings produced with the dyes according to the invention are dischargeable to white and are distinguished by good fastness characteristics, in particular by good wetfastness and lightfastness.

Compounds of particular technical importance are those of the formula Ia

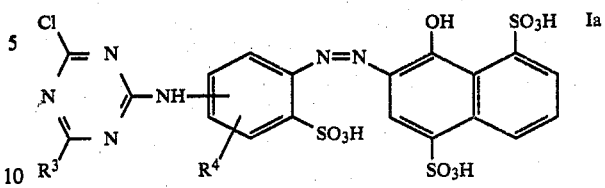

where $R^3$ is chlorine, unsubstituted or $C_2$–$C_4$-alkoxy-substituted $C_1$–$C_4$-alkoxy or phenyl and $R^4$ is hydrogen or hydroxysulfonyl.

In the Examples which follow, parts and percentages are by weight, unless stated otherwise.

EXAMPLE 1

The condensation product of 18.8 parts of 1,3-phenylenediamine-4-sulfonic acid and 19 parts of cyanuric chloride, in 950 parts of ice water, is stirred with 7 parts of sodium nitrite and 60 parts of hydrochloric acid (=1.09) for 2 hours at 0°–5° C. Excess nitrous acid is then destroyed with 1 part of amidosulfonic acid, a neutral aqueous solution of 30.4 parts of 1-naphthol-4,8-disulfonic acid is added to the diazo suspension, 16 parts of trisodium phosphate are introduced and the pH of the mixture is made neutral with dilute sodium hydroxide solution. The precipitation of the dye is completed by adding 140 parts of sodium chloride, the dye is filtered off and the press cake is dried at 40° C. under reduced pressure. 80 parts of a dark red powder are obtained; this dyes cellulose by conventional cold dyeing methods in deep yellowish red hues which are dischargeable to white, and which have very good wetfastness and lightfastness.

If instead of using cyanuric chloride, the synthesis is carried out with 2,4-dichloro-6-methoxy-s-triazine or 2,4-dichloro-6-phenyl-s-triazine, dyes with similar properties are obtained.

Further dyes according to the invention, of the formula Ib

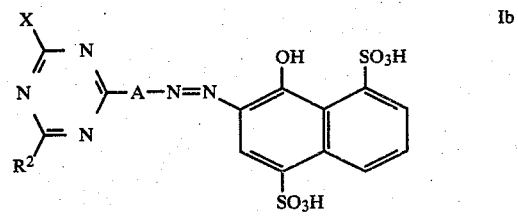

and their hues on cellulosic material are listed in the Table which follows:

| Example | X | $R^2$ | A | Hue |
|---|---|---|---|---|
| 2 | Cl | $C_2H_5$—O—$C_2H_4$—O— | —HN—⟨C₆H₃(CH₃)⟩—SO₃H | yellowish red |
| 3 | Cl | $(CH_3)_2CH$—O— | " | yellowish red |
| 4 | Cl | $C_6H_5$—O— | " | yellowish red |
| 5 | Br | Br | " | yellowish red |
| 6 | F | $CH_3O$ | " | yellowish red |

-continued
| Example | X | R² | A | Hue |
|---|---|---|---|---|
| 7 | Cl | C₆H₅— | 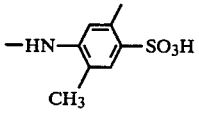 | yellowish red |
| 8 | Cl | 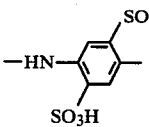 | 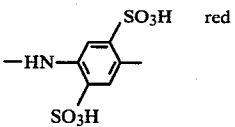 | red |
| 9 | Cl | Cl | " | red |
| 10 | Cl | 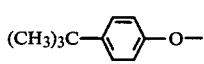 | " | red |
| 11 | Cl | Cl | 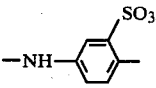 | bluish red |
| 12 | Cl | C₂H₅—O | " | bluish red |
30 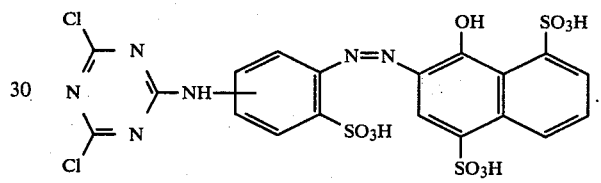
We claim:
1. A reactive dye which in the form of the free acid has the formula:
* * * * *